UNITED STATES PATENT OFFICE.

F. MARQUARD, OF RAHWAY, NEW JERSEY.

IMPROVEMENT IN THE MANUFACTURE OF WHITE RUBBER.

Specification forming part of Letters Patent No. 51,332, dated December 5, 1865.

*To all whom it may concern:*

Be it known that I, FRANK MARQUARD, of Rahway, in the county of Union and State of New Jersey, have invented a new and useful Improvement in the Manufacture of White Rubber, &c.; and I do hereby declare that the following is a full, clear, and exact description thereof, which will enable those skilled in the art to make and use the same.

This invention relates to a certain improvement on a process for treating india-rubber or allied gums on which a patent has been allowed to Engelhard and Havemann, November 22, 1859. In this process the rubber or other gum is treated as follows: Solid lumps of india-rubber or gutta-percha are dissolved in one of the well-known solvents of such gums, and this solution is brought in contact with the chlorine by passing a stream of gaseous chlorine into the same in order to bring the chlorine in intimate contact with the gum contained in said solution. When the combination of the gum with the chlorine is perfected the solvent is removed by evaporation at a low temperature or by filtering, and the composition is well washed with alcohol and pressed and dried.

The object of this present invention is to avoid the use of alcohol for washing out the gum after it has been treated with chlorine gas, and this object is effected by substituting for the alcohol hot water and subjecting the gum, after having been dissolved and washed with hot water or while it is being washed, to a distilling process.

By the use of hot water in place of alcohol for washing the gum, and by subjecting the solution to a distilling process, the following advantages are gained:

First, a very expensive article, such as alcohol, is dispensed with, and in its place a cheap article, such as hot water, is substituted.

Second, the solvent used in the process (generally chloroform) is regained almost entirely, and can be used over and over again.

Third, the chlorine, having a greater affinity for hot water than alcohol, is more perfectly removed by the water than it can be done with alcohol.

Fourth, the elasticity and tenacity of the gum, which is destroyed if the chlorine remains too long in contact therewith or if too much of the chlorine is retained by it, is not endangered when the same is treated according to my process, and a superior article is produced.

In fact, by substituting hot water for alcohol, and by the additional distilling process, the manufacture of white rubber or other similar gum is rendered feasible, whereas under the old process this manufacture is so expensive that it can never be used to any advantage.

By using a still with an agitator the washing and distilling processes can be combined and the labor required to carry out the process considerably reduced.

The gum prepared according to my process is comparatively cheap. The solvent, being mostly recovered, is used over and over again, and the product obtained is tenacious and tough. If it is desired to render the same hard, I treat it with phosphate of lime, which I apply in the form of a fine precipitate.

In this process I prefer the use of phosphate of lime to that of pure lime, which has heretofore been used, for the following reasons:

First, phosphate of lime—viz., phosphorus and lime—being the principal compound of bone, (and, of course, of ivory also,) it will, for this reason alone, be a better assistant in forming a substitute for bone or ivory, and will give a better mass.

Second, the phosphate of lime can be obtained of greater purity than the oxide of calcium, and the color of the former more closely resembles that of bone or ivory.

Third, the pure lime, having more or less caustic reaction, will tend to testing the fibers of the gum, which should impart to the whole compound strength and tenacity.

What I claim as new, and desire to secure by Letters Patent, is—

1. Substituting hot water for alcohol in the process of washing india-rubber or allied gums previously treated with chlorine, as and for the purpose described.

2. Subjecting the product obtained by treating india-rubber or allied gums with chlorine to a distilling process, either simultaneously while the same is being washed or after the washing process is completed, substantially as and for the purpose set forth.

3. The use of phosphate of lime, in combination with the product obtained by the process above specified, for the purposes set forth.

F. MARQUARD.

Witnesses:
WM. F. MCNAMARA,
C. L. TOPLIFF.